United States Patent [19]

Houlberg

[11] 4,089,220
[45] May 16, 1978

[54] FLUID FLOW METER
[75] Inventor: Donald M. Houlberg, Delavan, Wis.
[73] Assignee: Sta-Rite Industries, Inc., Racine, Wis.
[21] Appl. No.: 780,330
[22] Filed: Mar. 23, 1977
[51] Int. Cl.² .............................................. G01F 1/00
[52] U.S. Cl. ..................................... 73/194 C; 73/255
[58] Field of Search ............ 73/194 C, 194 E, 194 M, 73/229, 253, 255

[56] References Cited
U.S. PATENT DOCUMENTS

| | | | |
|---|---|---|---|
| 3,381,531 | 5/1968 | Arutjunov et al. | 73/255 |
| 3,443,432 | 5/1969 | Shonin | 73/255 |
| 3,805,609 | 4/1974 | Sato | 73/194 |
| 3,827,297 | 8/1974 | Griverus | 73/194 |
| 3,884,069 | 5/1975 | Lind | 73/194 |

FOREIGN PATENT DOCUMENTS

| | | | |
|---|---|---|---|
| 4,420,898 | 2/1969 | Japan | 73/194 |
| 1,209,547 | 10/1970 | United Kingdom | 73/194 |

Primary Examiner—Herbert Goldstein
Attorney, Agent, or Firm—Mason, Kolehmainen, Rathburn & Wyss

[57] ABSTRACT

A flow meter including a housing with a coaxial inlet and outlet is disclosed. The housing of the flow meter defines an inner chamber including a pair of vane assemblies surrounding the inlet and outlet. A track is defined between the vane assembly and the housing. The meter further includes a fluid responsive member positioned in the track and rotated therein by fluid flow through the meter. The rate of rotation of the member is measured by an assembly mounted on the housing.

12 Claims, 3 Drawing Figures

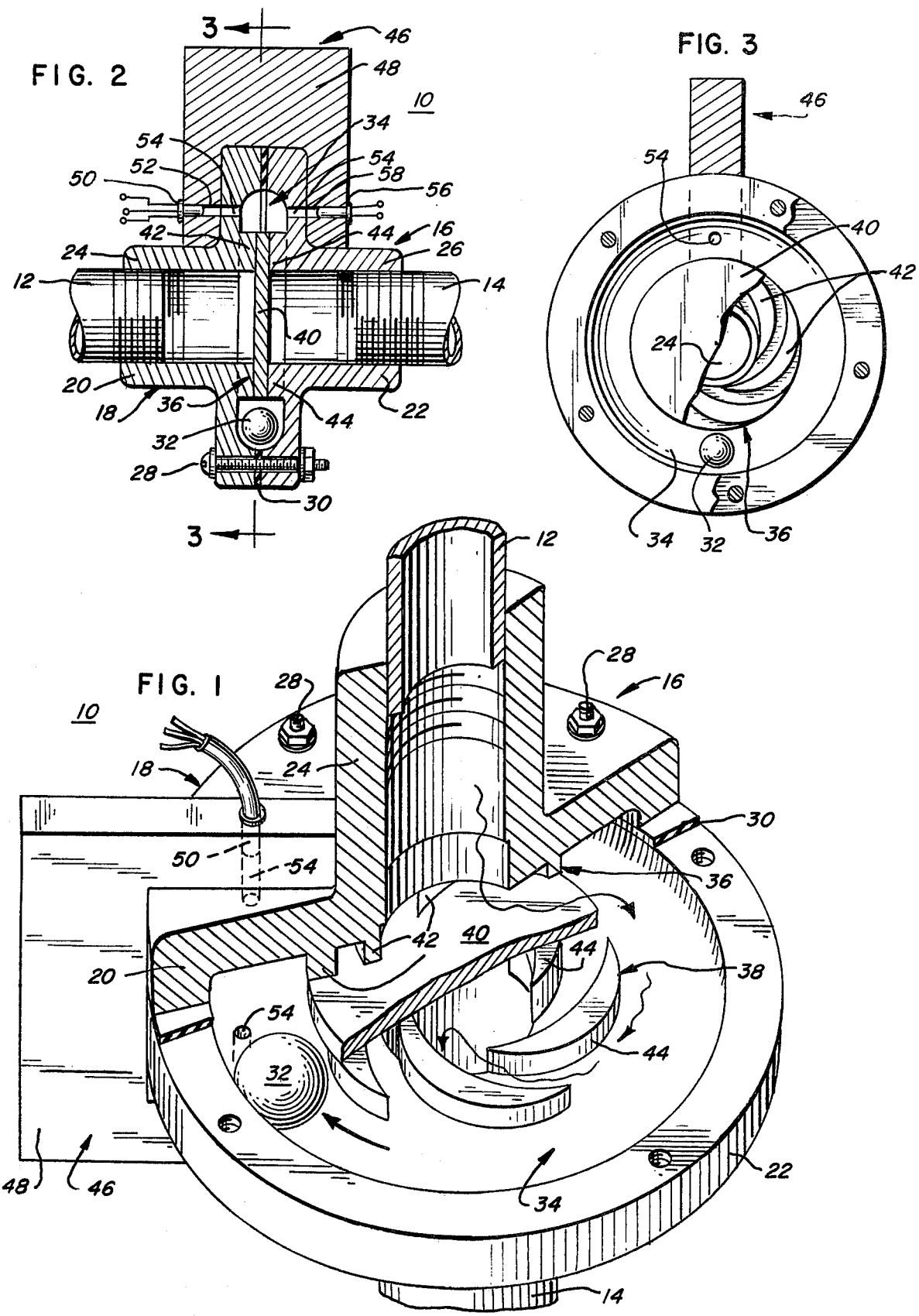

FLUID FLOW METER

BACKGROUND OF THE INVENTION

1. Field of the Invention

The present invention relates to flow meters employed for the measurement of fluid flow through a fluid pipe line or conduit.

2. Description of the Prior Art

Many approaches to measuring the flow of fluid through a pipe line are employed in the prior art. Typical flow meters employ either a spinning element or a ball in a track. In the meters employing a spinning element the element usually includes several paddles that interact with fluid flowing through the meter causing rotation of the element. This rotation is then measured. Such a prior art arrangement is difficult to assemble and is subject to continual maintenance requirements due to the complexity of the element's structure and its low friction mounting in the housing.

The meters that employ a ball bounded within a track direct all or a portion of the fluid flow through a tangential inlet in the valve allowing the fluid to impinge upon the ball causing the ball to rotate within the track. This rotation is then measured in order to determine the flow rate through the meter. One of the difficulties in using this prior art meter is that due to the centrifugal force of fluid passing through the meter, the fluid can experience a pressure drop and a sharp increase in fluid velocity depending on the arrangement of the inlet and outlet in the meter. These changes in the fluid can substantially reduce the accuracy of the meter.

One prior art procedure for preventing a pressure drop and a sharp increase in fluid velocity is to employ a tangential outlet in the meter. In this manner, once fluid enters the meter, it is directed to a circular track whereupon the fluid flows around the track until it encounters the outlet. Since the fluid does not change its direction of flow in entering the tangential outlet, smoother flow of the fluid out of the valve results avoiding a large pressure drop and a sharp increase in fluid velocity. In addition, the tangential positioning of the outlet allows the centrifugal force of the fluid that is developed as it flows around the track to assist rather than hamper the exit of fluid through the outlet, thus further limiting the pressure drop and the increase in fluid velocity.

The employment of a tangential outlet in combination with a tangential inlet, however, results in a meter that is less compact and necessitates a change in the direction of the fluid line in order to be installed. Moreover, this construction prevents the measurement of fluid flow in a bidirectional manner thus limiting its use to one way flow.

To overcome some of these problems related to tangentially positioned outlets, some prior art meters incorporate a set of vanes adjacent an axial outlet to direct fluid from the interior of the meter to the outlet. Such a meter is disclosed in U.S. Pat. No. 3,805,609. These meters, however, employ a tangential object and are incapable of measuring bidirectionally and of being mounted in-line with the fluid line.

SUMMARY OF THE INVENTION

An object of the present invention is to provide a new and improved meter for measuring fluid flow in a fluid line.

Another object of the present invention is to provide a new and improved meter that may be mounted within a fluid line without displacement in the alignment of the fluid line.

A further object of the present invention is to provide a new and improved fluid flow meter that may be employed to measure bidirectional fluid flow.

Briefly, the above and other objects and advantages of the present invention are achieved by providing an improved flow meter including a housing with a fluid inlet and a fluid outlet that are coaxially defined on opposite sides of the housing. The inlet and outlet are adapted to be connected to a fluid line and are in fluid communication with a chamber defined within the housing. Mounted to the housing and within the chamber are a pair of vane assemblies including a first set of vanes secured to the chamber adjacent to and surrounding the fluid inlet and a second group of vanes secured to the chamber adjacent to and surrounding the outlet.

The first group of vanes functions to direct flow from the inlet to an annular track defined between the outer periphery of the vane assembly and the inner periphery of the chamber. The second group of vanes functions to direct fluid flow from the track to the outlet of the meter.

Mounted within the track is a rotary element intended to interact with the fluid flow through the meter. The rotary element is preferably a ball of a density substantially equal to the fluid in the fluid line and of a smaller dimension than the track. In this manner, fluid flow introduced to the inlet of the meter flows through the first vane assembly into the track causing the ball to move within the track. The fluid is then directed by the second group of vanes to the outlet. The velocity of the fluid causes the ball to rotate within the track at substantially the same velocity as the fluid flow. The rate of rotation of the ball within the track may be measured by an assembly that may include a light emitting diode and a detection device coupled to an appropriate circuit to measure the number of rotations of the ball over a period of time.

In addition, due to the coaxial alignment of the inlet and outlet, fluid flow through the meter may be reversed with equally efficient measurement of the flow rate.

BRIEF DESCRIPTION OF THE DRAWING

The present invention together with the above and other objects and advantages will best appear from the following detailed description of an illustrative embodiment of the invention shown in the accompanying drawing, wherein:

FIG. 1 is a partially cut-away, perspective view of a fluid flow meter constructed in accordance with the present invention;

FIG. 2 is a cross sectional view on a reduced scale of the fluid flow meter of FIG. 1; and FIG. 3 is a partially cut-away view taken along line 3—3 of FIG. 2.

DESCRIPTION OF THE PREFERRED EMBODIMENT

Having reference now to the drawing, there is illustrated a fluid pipe line designated as a whole by the reference numeral 10. The pipe line 10 includes pipes 12 and 14 that are employed to conduct fluid from a fluid source such as a water supply to a device such as a water softener. In order to measure and record the flow rate and volume, the fluid line 10 includes a bidirectional flow meter generally designated by the reference numeral 16.

The meter 16 is intended to be mounted in-line with the pipes 12 and 14 in a manner such that the pipes 12 and 14 need not be misaligned to be coupled to the meter 16. In addition, the meter 16 is adapted to measure and record flow bidirectionally thereby eliminating the possibility of improper installation as a result of reversing the meter 16. The bidirectional capability of the meter 16 also allows reverse flow in the line 10, if so desired, once the meter 16 has been installed. Further, the meter 16 is constructed such that the operation and response of the flow meter 16 is linear over a wide range of fluid flow rates thereby enhancing the reliability of the meter 16.

To accomplish these objectives the meter 16 includes a substantially symmetrical housing 18 including a first 20 and a second 22 substantially identical housing portions. Each housing portion 20 and 22 includes a port 24 and 26, respectively, that is adapted to be coupled to one of the pipes 12 and 14. In the illustrated embodiment, the port 24 is coupled to the pipe 12 and is the inlet port and the port 26 is coupled to the pipe 14 and is the outlet port. In addition, once the housing 18 is assembled, the ports 24 and 26 are coaxial. To assemble the housing 18, the housing portions 20 and 24 are secured together by several fasteners 28 and an O-ring or a similar device such as a gasket 30 is mounted at the interface of the joined housing portions 20 and 22 to prevent leakage.

In order to measure the rate of fluid flow, the meter 16 includes a ball 32 that is positioned within an annular track 34 defined by the housing portions 20 and 22. The ball 32 is of a smaller diameter or transverse dimension than the same dimension of the track 34. In this manner, as fluid is introduced into the meter 16, the ball 32 is less likely to be hung up by an accumulation of debris between the ball 32 and track 34. Furthermore, the ball 32 may be fabricated of a material having a density substantially equal to the density of the fluid in the line 10 thus reducing the vibration of the ball 32 within the track 34 during fluid flow.

Some of the problems experienced in prior art meters due to an axial outlet such as outlet 26 are the loss of pressure and the increase in velocity of the fluid as it flows through the meter. In accordance with the present invention, these problems are solved by providing a smooth fluid flow path from the track 34 to the outlet 26. In addition, an axial inlet such as inlet 24 is also a problem in the prior art meters since the direction of fluid from the inlet to the track 34 cannot be imparted to the fluid in a sufficiently smooth manner to avoid pressure loss and an increase in velocity.

To overcome these problems the meter 16 includes a first vane assembly 36 molded on the first housing portion 20 adjacent to and surrounding the inlet 24, and a second vane assembly 38 molded on the second housing portion 22 adjacent to and surrounding the outlet 26. The first and second vane assemblies 36 and 38 are separated by an impervious plate or disc 40 that serves to prevent direct axial flow through the meter 16. The plate 40 may be fabricated from rubber or a similar resilient material.

The first vane assembly 36 serves to direct the fluid flow in a spiral manner from the inlet 24 to the track 34. The fluid flow, in this manner, has both a tangential and radial flow component as it enters the track 34. To accomplish this physical alteration in the direction of the fluid flow, the first vane assembly 36 includes several vanes 42. The vanes 42 are of a curvilinear configuration that begin adjacent to the inlet 24 and gently curve in a radial or spiral direction terminating adjacent to the track 34. In this manner, fluid flowing through the inlet 24 is uniformly directed by the vanes 42 to several different locations in the track 34. Accordingly, the entire flow of fluid does not directly impinge on the ball 32 but, rather, the fluid flow is along a toroidal path about the track 34 resulting in a tangential impingement by part of the fluid against the ball 32. Additionally, since fluid is introduced in front of and behind the ball 32, the ball 32 experiences a pushing force from the fluid behind it and a pulling force due to a venturi or negative pressure effect from the fluid flowing in front of and around the ball 32. This push-pull effect induces the ball 32 to rotate even at very low flow rates through the meter 16 thereby enhancing the meter's utility.

The second vane assembly 38 serves to direct fluid in a spiral manner from the track 34 to the outlet 26 such that the flow has both radial and tangential flow components. This is accomplished in a gradual or smooth manner thereby minimizing pressure loss and velocity increase of the fluid. To provide this smooth direction change the second vane assembly 38 includes several vanes 44 molded onto the housing portion 22 and oriented in a direction opposite to the vanes 42. In this manner, fluid is introduced into the inlet 24 and is directed by the vanes 42 into the track 34 whereupon the ball 32 is rotated within the track 34 under the influence of the fluid. As the fluid flows within the track 34, it interacts with the vanes 44 and is spirally directed from the track 34 to the outlet 26.

The outer periphery of the vane assemblies 36 and 38 as defined by the vanes 42 and 44 with the inner periphery of the housing 18 further define the track 34 along which the ball 32 rotates.

Since the vanes 42 and 44 are molded onto the housing portions 20 and 22, the orientation of the vanes 42 and 44 relative to each other may be altered by rotation of one of the housing portions 20 or 22 relative to the other prior to positioning the portions together. This provides the installer of the meter 16 with the ability to adjust the various flow characteristics of the meter 16.

Moreover, due to the employment of the vane assemblies 36 and 38 in the manner described, the inlet 24 and the outlet 26 are coaxially defined on the housing 18. Consequently, the meter 16 may be mounted in the fluid line 10 without the necessity of displacing the pipes 12 and 14 in order to accomodate ports that are not coaxial such as, for example, tangential ports as employed in prior art meters.

It should also be noted that the vane assemblies 36 and 38 have been described as including vanes 42 and 44, respectively, that are molded on the corresponding housing portions 20 and 22; however, the vanes 42 and 44 could be molded on the plate 40 or positioned within the housing 18 as separate units.

As flow is introduced into the meter 16 as described, the ball 32 is rotated within the track at a rate that is proportional to the rate of fluid flow through the fluid line 10. Since flow is introduced at several locations around the entire track 34 and also exits at several locations around the entire track, some of the flow actually bypasses the ball 32 yet accurate readings are still obtained. This bypass capability further assists in preventing a change in pressure and velocity of the fluid in the line 10 due to the employment of the meter 16.

The rate of rotation of the ball 32 can be measured and displayed thus providing a reading as to the flow rate within the line 10. This measuring and display function is accomplished through the employment, in the preferred embodiment, of an opto-electric pick-up assembly 46. The assembly 46 serves to establish a beam of light across the track 34 that is broken by the ball 32 during each revolution. This action may be counted and recorded by an appropriate assembly well known in the art.

More specifically, the assembly 46 includes a mounting yoke 48 of a configuration that allows it to be mounted on the housing 18. The yoke 48 includes a photo-transistor 50 that is mounted in a passage 52 defined in the yoke 48. The passage 52 is aligned with a passage 54 that extends through the housing 18 and intersects the track 34. A light emitting diode 56 is diagonally mounted on the yoke 48 in a passage 58 defined also in the yoke 48. The passages 52, 54, and 58 are aligned such that light is emitted by the diode 56 and received by the transistor 50.

An appropriate power source is coupled to the diode 56 and the transistor 50 and the output of the transistor 50 is coupled to a counting device. In this manner, as the ball 32 rotates in the track 34, it will break the beam of light emanating from the diode 56 during each revolution. This break in the beam of light is counted and displayed as a function of flow through the line 10.

While the pick-up assembly 46 has been described as of the opto-electric type, other types of pick-ups may be employed. For example, magnetic, resistance, capacitive or ball contact sensing assemblies may be used; particularly, if the fluid in the line 10 is opaque.

While the invention has been described with reference to details of the illustrated embodiment, it should be understood that such details are not intended to limit the scope of the invention as defined in the following claims.

What is claimed and desired to be secured by Letters Patent of the United States is:

1. A meter for measuring the flow rate of fluid in a fluid line comprising:
    a casing having a fluid inlet and a fluid outlet;
    a chamber defined within said casing, said chamber being in fluid communication with said inlet and said outlet;
    a first vane assembly mounted in said chamber and adjacent said inlet;
    a second vane assembly mounted in said chamber and adjacent said outlet;
    means for partitioning said chamber and separating said first and second vane assemblies;
    a fluid flow responsive member positioned in said chamber radially outward of said first and second vane assemblies and being adapted to rotate in said chamber upon introduction of fluid flow therein; and
    an annular track defined between the outer peripheries of said first and second vane assemblies and the inner periphery of said casing.

2. The meter claimed in claim 1 wherein said flow responsive member being a ball positioned in said track and being of a smaller cross sectional area than the cross sectional area of said track.

3. The meter claimed in claim 2 wherein said ball being of substantially the same as the density of said fluid.

4. The meter claimed in claim 1 wherein said first vane assembly being oriented in a first direction relative to said casing to direct fluid from said inlet to said track, and said second vane assembly being oriented in a second direction relative to said casing to direct fluid from said track to said outlet.

5. The meter claimed in claim 1 wherein said inlet and said outlet being coaxial.

6. The meter claimed in claim 1 further comprising means for detecting the movement of said fluid flow responsive member in said casing.

7. A fluid flow meter comprising:
    a housing including an inlet and an outlet, said inlet and said outlet being coaxial and on opposite sides of said housing, said inlet and outlet being adapted to be coupled to a fluid line;
    said housing defining an interior chamber in fluid communication with said inlet and said outlet;
    a vane assembly mounted on said housing and in said chamber, said vane assembly including a first vane group secured to said housing and surrounding said inlet to impart radial and tangential components to said flow and a second vane group secured to said housing and surrounding said outlet to impart radial and tangential components to said flow;
    a track defined within said housing between the outerperiphery of said vane assembly and the inner periphery of said chamber; and
    a flow responsive member positioned in said track and adapted to be rotated in said track under the influence of fluid flow through said meter; wherein said first vane group being oriented in said chamber relative to said inlet to direct fluid flow in a first direction away from said inlet and to said track, and said second vane group being oriented in said chamber relative to said outlet to direct said fluid in a second direction from said track to said outlet.

8. The meter claimed in claim 7 further comprising an imperforate member positioned between said first and second vane groups and within the outer periphery of said first and second vane groups.

9. The meter claimed in claim 7 wherein said flow responsive member being circular and of substantially the same density as the density of said fluid, said flow responsive member also being of a smaller transverse dimension than the corresponding dimension of said track.

10. A fluid flow meter comprising in combination:
    a housing defining a closed fluid flow track;
    inlet means for introducing fluid into said track in a distributed manner around the entire track;
    outlet means permitting fluid to flow from said track in a distributed manner around the entire track;
    a movable element disposed in said track and free to move repetituously around said closed track;
    means located at a point along said track for detecting the passage of said element past said point; and
    said inlet means and outlet means producing flows relative to said track having both radial and tangential components, the tangential.components of both the inlet flow and outlet flow being directed in one direction to produce unidirectional fluid flow in said track; said housing including first and second portions adapted to be coupled together to define said housing, said inlet means being defined on said first portion and said outlet means being defined on said second portion, said first and second portions being adapted to be rotated relative to each other prior to said coupling to vary the positions of said outlet and inlet means relative to each other.

11. The meter claimed in claim 10 said inlet means including a plurality of vanes oriented in said housing for imparting said components to said fluid as said fluid enters said track, and said outlet means including a plurality of vanes oriented in said housing for imparting said components to said fluid as said fluid leaves said track.

12. The meter claimed in claim 10 said inlet means including a fluid inlet port defined on said housing, and said outlet means defining an outlet port defined on said housing, said inlet and outlet ports being coaxial.

* * * * *